United States Patent
Kral et al.

(10) Patent No.: US 12,259,041 B2
(45) Date of Patent: Mar. 25, 2025

(54) CONNECTION BETWEEN A SHIFTING ELEMENT AND A SHIFT TRACK SELECTION ROD

(71) Applicant: KNORR-BREMSE Systeme fuer Nutzfahrzeuge GmbH, Munich (DE)

(72) Inventors: Martin Kral, Munich (DE); Hans Holna, Taufkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 180 days.

(21) Appl. No.: 17/279,662

(22) PCT Filed: Sep. 23, 2019

(86) PCT No.: PCT/EP2019/075495
§ 371 (c)(1),
(2) Date: Mar. 25, 2021

(87) PCT Pub. No.: WO2020/064616
PCT Pub. Date: Apr. 2, 2020

(65) Prior Publication Data
US 2021/0388900 A1    Dec. 16, 2021

(30) Foreign Application Priority Data

Sep. 28, 2018 (DE) ..................... 10 2018 216 742.7

(51) Int. Cl.
*F16H 63/30* (2006.01)
(52) U.S. Cl.
CPC . *F16H 63/3069* (2013.01); *F16H 2063/3076* (2013.01); *F16H 2063/3083* (2013.01)

(58) Field of Classification Search
CPC ......... F16H 63/3069; F16H 2063/3076; F16H 2063/3083; F16H 2063/204
USPC ............................ 74/473.24, 473.25, 473.36
See application file for complete search history.

(56) References Cited

U.S. PATENT DOCUMENTS

| | | | | |
|---|---|---|---|---|
| 2,906,139 A | * | 9/1959 | Ferchl et al. | F16H 61/0293 74/473.1 |
| 4,335,623 A | * | 6/1982 | Kronstadt | F16H 63/20 74/473.21 |
| 4,449,416 A | * | 5/1984 | Huitema | F16H 63/304 74/DIG. 7 |

(Continued)

FOREIGN PATENT DOCUMENTS

| | | |
|---|---|---|
| CN | 106133407 A | 11/2016 |
| CN | 108953592 A * | 12/2018 |

(Continued)

OTHER PUBLICATIONS

Chinese-language Office Action issued in Chinese Application No. 201980063358.X dated Nov. 5, 2021 with partial English translation (10 pages).

(Continued)

*Primary Examiner* — Bobby Rushing, Jr.
(74) *Attorney, Agent, or Firm* — Crowell & Moring LLP

(57) ABSTRACT

A shift track selection rod and a shifting element are provided which can be connected to one another without additional fastening elements. A system consists of the shift track selection rod and the shifting element. A transmission actuator includes the system. A transmission includes the system or the transmission actuator.

16 Claims, 1 Drawing Sheet

(56) References Cited

U.S. PATENT DOCUMENTS

| | | | |
|---|---|---|---|
| 5,743,147 A | | 4/1998 | Gazyakan |
| 2008/0034912 A1* | | 2/2008 | Feher .................. F16H 63/3408 74/473.24 |
| 2011/0194907 A1* | | 8/2011 | Guy ...................... B23B 31/113 279/93 |
| 2017/0122432 A1 | | 5/2017 | Ehrlich et al. |
| 2017/0146120 A1* | | 5/2017 | Kang ...................... F16H 61/32 |

FOREIGN PATENT DOCUMENTS

| | | | | |
|---|---|---|---|---|
| CN | 109114218 A * | 1/2019 | ............. | F16H 63/20 |
| DE | 293488 C | 8/1915 | | |
| DE | 43 42 957 A1 | 6/1995 | | |
| DE | 102010038057 A1 * | 12/2011 | ............. | F16H 63/32 |
| DE | 10 2013 006 390 A1 | 10/2014 | | |
| DE | 10 2013 212 633 A1 | 12/2014 | | |
| DE | 10 2014 007 626 A1 | 12/2014 | | |
| DE | 10 2016 218 340 A1 | 3/2018 | | |
| KR | 20050055447 A * | 6/2005 | | |
| KR | 20160082450 A * | 12/2014 | | |
| WO | WO-2014170231 A1 * | 10/2014 | ......... | F16H 61/0003 |
| WO | WO-2018019337 A1 * | 2/2018 | | |

OTHER PUBLICATIONS

International Preliminary Report on Patentability (PCT/IB/326 & PCT/IB/373) issued in PCT Application No. PCT/EP2019/075495 dated Apr. 8, 2021, including English translation of document C2 (German-language Written Opinion (PCT/ISA/237) filed on Mar. 25, 2021) (nine (9) pages).

International Search Report (PCT/ISA/210) issued in PCT Application No. PCT/EP2019/075495 dated Dec. 4, 2019 with English translation (four (4) pages).

German-language Written Opinion (PCT/ISA/237) issued in PCT Application No. PCT/EP2019/075495 dated Dec. 4, 2019 (six (6) pages).

German-language Office Action issued in German Application No. 10 2018 216 742.7 dated Jul. 17, 2019 (six (6) pages).

* cited by examiner

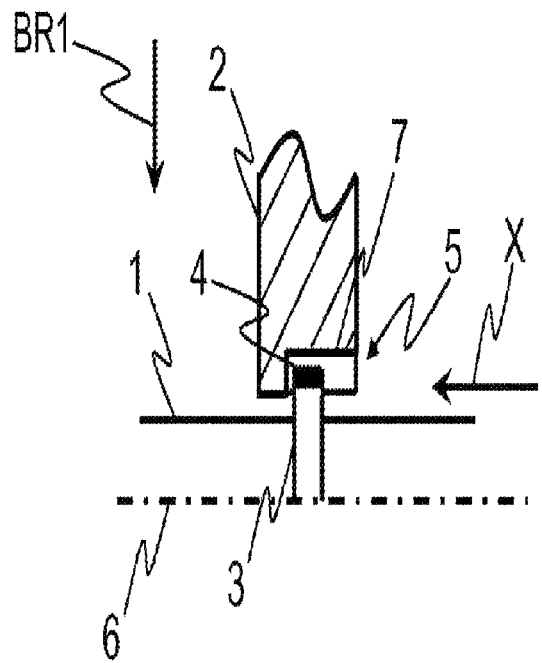
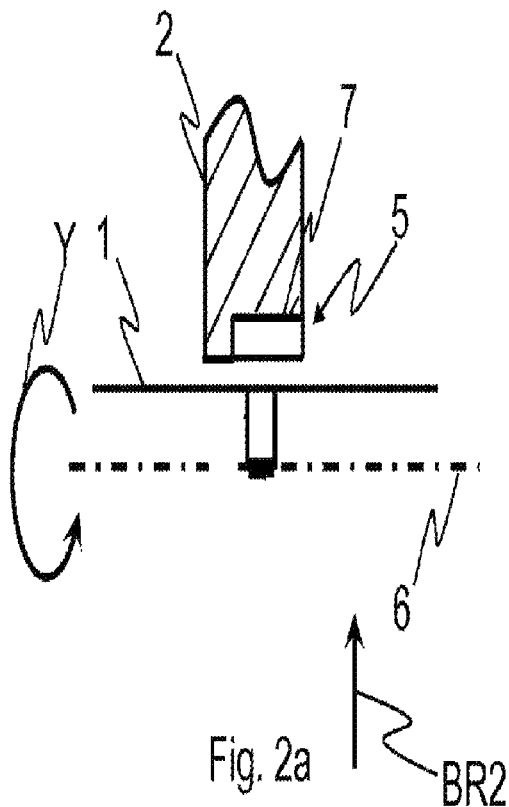
Fig. 1a
Fig. 2a
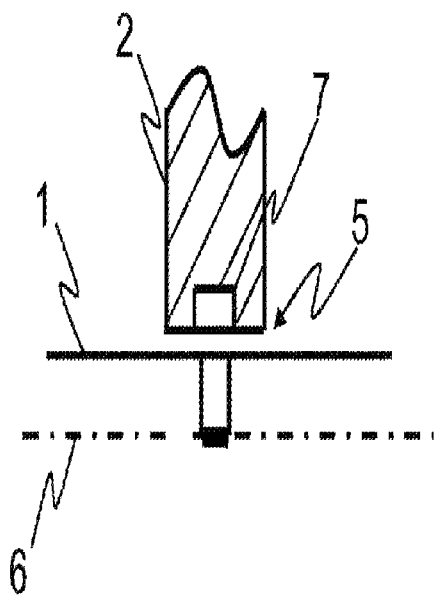
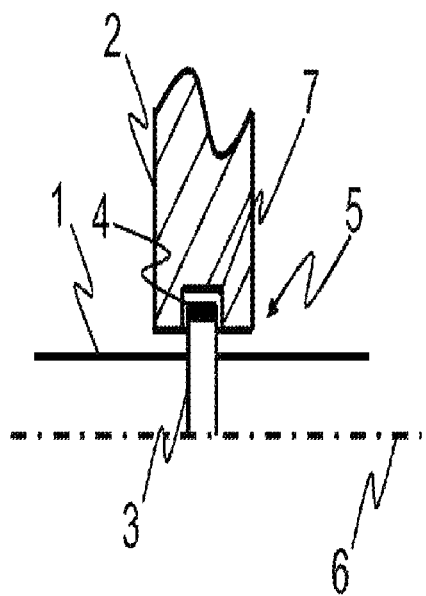
Fig. 1b
Fig. 2b

CONNECTION BETWEEN A SHIFTING ELEMENT AND A SHIFT TRACK SELECTION ROD

BACKGROUND AND SUMMARY OF THE INVENTION

The invention concerns a shifting element and a shift track selection rod for a transmission, in particular for a manual transmission. The invention furthermore concerns a system of a shift track selection rod and a shifting element, a transmission actuator having the system, and a transmission having the system or a transmission actuator.

Gear shifts today take place using shifting elements which are designed to be rotatable about an axis of a shift track selection rod. For this, the shifting element is axially fixed on the shift track selection rod. The shift track selection rod may be moved in the direction of the shift track, preferably in the direction of its axis, in order to move the shifting element into the desired position in which it is brought into engagement with the desired gear selector element, in particular a shifting guide. The gear selector element is here designed to be moved into a selection position in which a corresponding gear in a transmission is engaged, for example by means of a shift collar. Usually, the gear selector element is brought into the selection position by a rotational movement of the shifting element in which this moves the gear selector element. The shifting element is here configured to rotate about the axis of the shift track selection rod.

At present, the fixing of the shifting element on the shift track selection rod is structurally complex and further components must be provided which fix the shifting element axially on the shift track selection rod. In this way, in particular during maintenance of a shift actuator or a transmission having such a shifting element, extensive and complex removal and installation work must be performed.

It is therefore an object of the present invention to create a connection between the shifting element and the shift track selection rod which is simple to produce and simple to install, and which can be achieved or produced without great cost.

This object is achieved with the subjects of the independent claims. Advantageous refinements are the subject of the subclaims.

According to the invention, a shift track selection rod is provided which is configured for mounting a shifting element, wherein the shift track selection rod has an axis and a connection geometry which are configured for fixing the shifting element by form fit at a position along the axis. Thus advantageously, no further elements need be fixed or provided on the shift track selection rod in order to fix the shifting element.

The shift track selection rod is preferably designed to be provided in a transmission actuator.

The connection geometry is preferably designed to come into engagement with a correspondence geometry of the shifting element in order to form the fixing along the axis. Thus further elements for forming the fixing are superfluous since the shift track selection rod and shifting element have corresponding geometries.

The connection geometry is here preferably configured as a depression and/or protrusion in and/or on the shift track selection rod.

Preferably, the connection geometry is configured in particular as a cam, protuberance, tongue, lug or groove. The design of the connection geometry as a shape which is simple to produce is advantageous. However, more complex shapes may also be provided which under some circumstances allow a better fixing or guidance of the shifting element on the shift track selection rod.

The construction of the connection geometry from elements such as in particular a cam, protuberance, tongue, lug or groove, facilitates production of the connection geometry.

Furthermore, preferably the connection geometry is configured such that several elements are arranged at a position along the axis, around the axis of the shift track selection rod, preferably at equal angular distances, particularly preferably on a circle.

Alternatively or additionally, the shift track selection rod, particularly preferably the connection geometry, is designed to be inserted in an opening of the correspondence geometry. In this way, simple installation of shift track selection rod and shifting element is possible in that the two can be push-fitted together.

The connection geometry is preferably designed to come into engagement with the correspondence geometry by means of a rotation, relative to the correspondence geometry, about the axis of the shift track selection rod and form the fixing. Thus the shift track selection rod and shifting element can be installed without further tools or aids.

Alternatively or additionally, the connection geometry is configured, in particular when the fixing is formed, so as not to hinder a rotational movement of the shifting element about the axis of the shift track selection rod, at least over an angular range, without the fixing being released along the axis. Thus the shifting element may execute a rotational movement, for example in a transmission actuator, in order to perform a shift in a transmission, without the fixing being released. It must merely be ensured that, during operation of the transmission actuator, the shifting element is not twisted so far that the connection geometry and the correspondence geometry can become separated from one another along the axis of the shift track selection rod.

Alternatively or additionally, the shift track selection rod is designed to be provided, preferably rotationally fixedly about its axis, in a transmission. Thus the shift track selection rod forms a rotational axis about which the shifting element can rotate.

According to the invention, furthermore a shifting element is provided which is designed to be fixed onto a shift track selection rod along an axis of the shift track selection rod, wherein the shifting element has a correspondence geometry which is configured for fixing the shifting element at a position along the axis of the shift track selection rod. Thus advantageously, no further elements need be fixed or provided on the shifting element for fixing the shifting element.

The shifting element is preferably configured as a shift finger.

The shifting element is preferably designed to be provided in a transmission actuator.

The correspondence geometry is preferably designed to come into engagement with a connection geometry of the shift track selection rod in order to form the fixing. In this way, further elements for forming the fixing are superfluous since the shift track selection rod and shifting element have corresponding geometries.

The correspondence geometry is preferably configured as a complementary geometry which is designed to block the shifting element with the connection geometry by means of a geometry adapted to the connection geometry. Blocking takes place preferably play-free in one spatial direction.

The correspondence geometry is preferably configured as a depression and/or protrusion in and/or on the shifting element.

Preferably, the correspondence geometry is configured in particular as a cam, protuberance, tongue, lug or groove. The design of the correspondence geometry as a shape which is simple to produce is advantageous. However, more complex shapes may also be provided which under some circumstances allow a better fixing or guidance of the shifting element on the shift track selection rod.

The construction of the correspondence geometry from elements such as in particular a cam, protuberance, tongue, lug or groove, facilitates production of the correspondence geometry.

Furthermore preferably, the correspondence geometry is configured such that several elements are arranged on a circle, preferably at equal angular distances.

Alternatively or additionally, the shifting element, in particular the correspondence geometry, has an opening which is configured for receiving the shift track selection rod, preferably the connection geometry, wherein the opening is designed preferably as a through-hole. In this way, the shift track selection rod and shifting element can easily be mounted in that by design, the two can be push-fitted together. Forming the opening as a through-hole also allows both ends of the shift track selection rod to be free after forming the fixing, and the shift track selection rod can be mounted at both ends, for example in a transmission actuator, whereby a more precise operation is possible, since such a mounting in particular reduces any flexion of the shift track selection rod which may occur.

Preferably, the correspondence geometry is designed to come into engagement with the connection geometry by means of a rotation, relative to the connection geometry, about the axis of the shift track selection rod and form the fixing. Thus the shift track selection rod and shifting element may be mounted without further tools or aids.

Alternatively or additionally, the correspondence geometry is configured, in particular when the fixing is formed, so as not to hinder a rotational movement of the shifting element about the axis of the shift track selection rod, at least over an angular range, without the fixing being released along the axis. Thus the shifting element may execute a rotational movement, for example in a transmission actuator, in order to perform a shift in a transmission, without the fixing being released. It must merely be ensured that, during operation of the transmission actuator, the shifting element is not twisted so far that the connection geometry and the correspondence geometry can become separated from one another along the axis of the shift track selection rod.

The rotational movement of the shifting element about the axis of the shift track selection rod preferably takes place relative to the shift track selection rod.

According to the invention, furthermore a system is provided composed of a shift track selection rod according to the invention and a shifting element according to the invention. The shift track selection rod described above and the shifting element described above may preferably be designed as a system for installation in a transmission actuator or a transmission.

Preferably, the connection geometry of the shift track selection rod and the correspondence geometry of the shifting element are in engagement with one another, so as to form a fixing of the shifting element along the axis of the shift track selection rod.

According to the invention, furthermore a transmission actuator is provided which has a system according to the invention, wherein the transmission actuator is configured to operate at least one gear selector element of a transmission by means of the shifting element.

The transmission actuator is preferably designed to displace or pivot the shift track selection rod by means of an actuator for shift track selection. Further preferably, the transmission actuator is designed to rotate the shifting element about the shift track selection rod by means of an actuator, in order to operate a gear selector element.

The actuation may take place preferably electrically, pneumatically or in another suitable fashion for exerting a force on the system.

According to the invention, furthermore preferably a transmission is provided, in particular a manual transmission, having a system according to the invention or a transmission actuator according to the invention, wherein the transmission is configured such that at least one gear selector element, preferably a shifting guide, of the transmission can be operated by means of the shifting element.

The transmission according to the invention preferably has at least one gear selector element.

By forming a transmission actuator or a transmission with the system according to the invention, this may be designed for easy maintenance since the shift track selection rod and shifting element can be removed rapidly without tools or further elements. Reinstallation is also thus facilitated.

A description is given below of preferred embodiments of the invention with reference to the appended drawings.

BRIEF DESCRIPTION OF THE DRAWINGS

FIG. 1a is a general sectional view of a shift track selection rod according to an embodiment of the invention and a shifting element according to an embodiment of the invention during a first installation step.

FIG. 1b shows the same configuration as in FIG. 1a from a second viewing direction.

FIG. 2a shows the same configuration, in the same viewing direction, as in FIG. 1a during a second installation step.

FIG. 2b shows the same configuration as in FIG. 2a from a third viewing direction.

DETAILED DESCRIPTION OF THE DRAWINGS

FIG. 1a shows a general sectional view of a shift track selection rod 1 and a shifting element 2 during a first mounting step, and FIG. 1b shows this mounting step from the viewing direction BR1 indicated, i.e. rotated by 90° relative to the illustration from FIG. 1a.

A shift track selection rod 1 is shown which has an axis 6. The shift track selection rod 1 and axis 6 are oriented from left to right in the illustration shown. On its periphery, the shift track selection rod 1 has a connection geometry 3 which has a maximum elevation 4 having the greatest distance from the axis 6.

Furthermore, a shifting element 2 is shown in sectional depiction. The shifting element 2 has a correspondence geometry 7 formed inside the shifting element 2. The shifting element 2, in particular the correspondence geometry 7, has an opening 5 in which the shift track selection rod 1, in particular the connection geometry 3, is inserted. The opening 5 is here configured as a through-hole so that the shift track selection rod 1 penetrates the shifting element 2 through the opening 5. The opening 5 is formed as part of the correspondence geometry 7 in the embodiment shown.

In FIG. 1a, the opening 5 has a greater inner diameter on the right-hand side of the shifting element 2 than on the left-hand side of the shifting element 2. This inner diameter does not extend rotationally symmetrically about the axis 6. In FIG. 1b, which is rotated by 90° relative to FIG. 1a, the opening 5 has the same smaller inner diameter on the right-hand side of the shifting element 2 as on the left-hand side.

The correspondence geometry 7 inside the shifting element 2 is furthermore configured such that the connection geometry 3, in particular the maximum elevation 4, may rotate unhindered therein about the axis 6. The smaller diameter of the opening 5 is configured so as to block a displacement of the connection geometry 3, in particular the maximum elevation 4, parallel to the axis 6. A displacement of the connection geometry 3, in particular the maximum elevation 4, parallel to the axis 6 is only possible if the connection geometry 3, in particular the maximum elevation 4, is aligned with the greater diameter of the opening 5.

The installation of the shift track selection rod 1 and shifting element 2 is described below.

For installation, the shift track selection rod 1, as shown in FIG. 1a, is inserted in the opening 5 of the shifting element 2 in the direction of an indicated movement X. The shift track selection rod 1 is here oriented relative to the shifting element 2 such that the maximum elevation 4 can be guided through the larger diameter of the opening 5.

Towards the end of the movement X, the shift track selection rod 1 and shifting element 2 are oriented as shown in FIGS. 1a and 1b. Then a movement of the shift track selection rod 1 and shifting element 2 in the direction of the axis 6 is blocked. This is shown in FIGS. 2a and 2b. FIG. 2a has the same viewing direction as FIG. 1a. FIG. 2b furthermore shows a second view, rotated by 90°, of the configuration in FIG. 2a from viewing direction BR2.

Locking takes place by a rotation Y of the shift track selection rod 1 relative to the shifting element 2. In the resulting orientation of the shift track selection rod 1 and shifting element 2, the maximum elevation 4 of the connection geometry 3 is oriented relative to the correspondence geometry 7 such that a movement of the shift track selection rod 1 relative to the shifting element 2 parallel to the axis 6 is not possible. The smaller inner diameter of the opening 5 in connection with the maximum elevation 4 thus blocks the relative movement between the shift track selection rod 1 and shifting element 2 along the axis 6.

The resulting connection between the shift track selection rod 1 and the shifting element 2 thus fixes the shifting element 2 on the shift track selection rod 1 in the direction of the axis 6, wherein at the same time, the shifting element 2 is rotatable about the shift track selection rod 1. The connection can only be released in the direction of the axis 6 when the maximum elevation 4 is congruent with the larger inner diameter of the opening 5.

On use of such a system of shift track selection rod 1 and shifting element 2 for operating a transmission, it must merely be ensured that the shifting element 2, which is rotated about the axis 6 of the shift track selection rod 1 in order to perform a shift, travels only through angular positions which exclude a congruence of the maximum elevation 4 and the larger diameter of the opening 5. Therefore on use of this system, complete rotation of the shifting element 2 about the axis 6 must not be permitted.

The use of this system in a transmission is described below.

The system is provided in a transmission such that a shift track may be selected and then a shift made within the transmission. On shift track selection, a corresponding gear selector element of the transmission is selected and then transferred to a selection position by means of a shift. The system may be provided directly in the transmission or in a transmission actuator which is designed for operating the transmission.

For shift track selection, an actuator is provided which is designed to displace the system such that the shifting element 2 comes into engagement with a corresponding gear selector element. The displacement may for example take place linearly along the axis 6. Alternatively or additionally, the shift track may be selected by means of rotation of the system, for example about an axis which in FIG. 1a is oriented perpendicularly to the drawing plane.

For shifting, a further actuator is provided which is configured such that, after shift track selection, the shifting element 2 is rotated about the axis 6 of the shift track selection rod 1. The rotational movement causes outward pivoting of an end of the shifting element 2 which is in engagement with the corresponding gear selector element. In this way, the gear selector element is transferred to a selection position. Shifting is complete.

As actuators, for example electric motors or pneumatic actuators or other suitable devices may be provided which may exert a force on system.

The invention is not restricted to the embodiments described above. Rather, further embodiments may be formed by combination of different features of the individual embodiments. Also, individual features may be modified. For example, the opening 5 of the correspondence geometry 7 may also be configured without a through-hole. Instead, merely a blind hole may be formed, wherein then the shift track selection rod 1 can no longer be guided through the shifting element 2. It is also conceivable to design the correspondence geometry 7 completely without an opening 5. Instead, the correspondence geometry 7 could for example be formed on the surface of the right-hand side of the shifting element 2 in FIG. 1a, wherein the correspondingly formed connection geometry 3 is configured to form a connection according to the invention with the correspondence geometry 7.

In addition, the design of the connection geometry 3 as a peripheral thickening of the shift track selection rod 1 with a maximum elevation 4 is not absolutely necessary. Embodiments are also conceivable which have a connection geometry 3 in the form of a depression, for example a partially circumferential groove. The correspondence geometry 7 of the shifting element 2 is then formed accordingly as a protuberance, for example as a tongue within the opening 5 which engages in the circumferential groove. Mounting here takes place for example in that the tongue of the shifting element 2 is brought into engagement with a groove of the shift track selection rod 1 which extends parallel to the axis 6 and runs out at one end of the shift track selection rod 1. From this end, the shifting element 2 with its tongue may be push-fitted onto the shift track selection rod 1 and moved along this groove up to the position along the axis 6 at which it is to be fixed. At this position, the partially circumferential groove adjoins the groove which runs parallel to the axis 6. When the tongue has reached the position, fixing takes place again by a rotation Y. The remaining function of the shift track selection rod 1, shifting element 2 or a system of the two, is identical to the embodiment described above.

LIST OF REFERENCE SIGNS

1 Shift track selection rod
2 Shifting element

3 Connection geometry
4 Maximum elevation
5 Opening
6 Axis
7 Correspondence geometry
BR1 Viewing direction
BR2 Viewing direction
X Movement
Y Rotation

What is claimed is:

1. A shift track selection rod mounted on a shifting element, comprising:
an axis and a connection geometry of the shift track selection rod, wherein the axis and the connection geometry fix the shifting element via a positive locking at a position along the axis, wherein
the connection geometry is configured so as not to hinder a rotational movement of the shifting element, about the axis of the shift track selection rod, for a shifting movement to select a shift track at least over an angular range, without the fixing being released along the axis, and
the shift track selection rod is provided rotationally fixedly about its axis, in a transmission actuator.

2. The shift track selection rod as claimed in claim 1, wherein
the connection geometry is designed to come into engagement with a correspondence geometry of the shifting element in order to form the fixing along the axis, and
the connection geometry is configured as at least one depression and/or at least one protrusion in and/or on the shift track selection rod.

3. The shift track selection rod as claimed in claim 2, wherein
the connection geometry is designed to come into engagement with the correspondence geometry by way of a rotation of the shift track selection rod about the axis relative to the correspondence geometry and form the fixing.

4. The shift track selection rod as claimed in claim 1, wherein
the connection geometry is configured as a cam, protuberance, tongue, lug or groove, and/or
the connection geometry is designed to be inserted in an opening of the correspondence geometry.

5. The shift track selection rod as claimed in claim 1, wherein the rotational movement is a relative movement between the shifting element and the shift track selection rod.

6. A shifting element which is designed to be fixed onto a shift track selection rod along an axis of the shift track selection rod, comprising:
a correspondence geometry of the shifting element, wherein the correspondence geometry fixes the shifting element at a position along the axis of the shift track selection rod, wherein
the correspondence geometry is configured so as not to hinder a rotational movement of the shifting element, about the axis of the shift track selection rod, for a shifting movement to select a shift track, at least over an angular range without the fixing being released along the axis.

7. The shifting element as claimed in claim 6, wherein
the correspondence geometry is designed to come into engagement with a connection geometry of the shift track selection rod in order to form the fixing along the axis, and wherein at least one of:

(i) the correspondence geometry is configured as at least one depression and/or at least one protrusion in and/or on the shifting element, or
(ii) the correspondence geometry is configured as a complementary geometry which is configured to block the shifting element with the connection geometry by way of a geometry adapted to the connection geometry.

8. The shifting element as claimed in claim 6, wherein one of:
the correspondence geometry is configured as a cam, protuberance, tongue, lug or groove, or
the correspondence geometry has an opening which is configured for receiving the shift track selection rod, wherein the opening is designed as a through-hole.

9. The shifting element as claimed in claim 6, wherein
the correspondence geometry is designed to come into engagement with the connection geometry by way of a rotation about the axis relative to the connection geometry, and form the fixing.

10. The shifting element as claimed in claim 6, wherein the shifting element is configured as a shift finger, and/or is designed to be provided in a transmission actuator.

11. The shifting element as claimed in claim 6, wherein the rotational movement is a relative movement between the shifting element and the shift track selection rod.

12. A system, comprising:
a shift track selection rod mounted on a shifting element, wherein the shift track selection rod has an axis and a connection geometry which fix the shifting element via a positive locking at a position along the axis, wherein
the connection geometry is configured so as not to hinder a rotational movement of the shifting element, about the axis of the shift track selection rod, for a shifting movement to select a shift track, without the fixing being released along the axis, and the shift track selection rod is provided rotationally fixed about its axis, in a transmission actuator, and
the shifting element is fixed onto the shift track selection rod along the axis of the shift track selection rod, wherein
the shifting element has a correspondence geometry which fixes the shifting element at a position along the axis of the shift track selection rod, wherein
the system is designed for installation in the transmission actuator.

13. A transmission actuator comprising a system as claimed in claim 12, wherein
the transmission actuator is designed to operate at least one gear selector element of a transmission by way of the shifting element.

14. A manual transmission comprising a system as claimed in claim 12, wherein
the manual transmission is configured such that at least one gear selector element of the manual transmission is operated by way of the shifting element of the system.

15. A manual transmission comprising a transmission actuator, wherein
the transmission actuator comprises a system as claimed in claim 12, and
the transmission actuator is designed to operate at least one gear selector element of a transmission by way of the shifting element.

16. The system as claimed in claim 12, wherein the rotational movement is a relative movement between the shifting element and the shift track selection rod.

* * * * *